(12) United States Patent
Topchy et al.

(10) Patent No.: US 10,735,808 B2
(45) Date of Patent: Aug. 4, 2020

(54) METHODS AND APPARATUS OF MEDIA DEVICE DETECTION FOR MINIMALLY INVASIVE MEDIA METERS

(71) Applicant: The Nielsen Company (US), LLC, New York, NY (US)

(72) Inventors: Alexander Topchy, New Port Richey, FL (US); Venugopal Srinivasan, Tarpon Springs, FL (US)

(73) Assignee: The Nielsen Company (US), LLC, New York, NY (US)

( * ) Notice: Subject to any disclaimer, the term of this patent is extended or adjusted under 35 U.S.C. 154(b) by 428 days.

(21) Appl. No.: 15/674,297

(22) Filed: Aug. 10, 2017

(65) Prior Publication Data
US 2019/0052930 A1 Feb. 14, 2019

(51) Int. Cl.
*H04N 21/442* (2011.01)
*H04H 60/54* (2008.01)
(Continued)

(52) U.S. Cl.
CPC ...... *H04N 21/44204* (2013.01); *H04H 60/00* (2013.01); *H04H 60/54* (2013.01);
(Continued)

(58) Field of Classification Search
None
See application file for complete search history.

(56) References Cited

U.S. PATENT DOCUMENTS 7,049,933 B1  5/2006  Koerner
7,958,526 B2  6/2011  Wheeler et al.
(Continued)

FOREIGN PATENT DOCUMENTS

WO  2010049809  5/2010
WO  2015156843  10/2015

OTHER PUBLICATIONS

International Searching Authority, "International Search Report," issued in connection with International Patent Application No. PCT/US2018/046058, dated Nov. 28, 2018, 3 pages.
(Continued)

*Primary Examiner* — Ricky Chin
(74) *Attorney, Agent, or Firm* — Hanley, Flight & Zimmerman, LLC

(57) ABSTRACT

Methods, apparatus, systems and articles of manufacture are disclosed for media crediting and, more particularly, methods and apparatus of media device detection for minimally invasive media meters. An example apparatus disclosed herein to detect media devices presenting media comprises a cluster generator to generate a cluster of media locations from a reference population of media locations based on media identifying information received from a presentation of media at an unidentified media device at a first media location, a media device determiner to determine media devices available at the media locations in the cluster of media locations, a cluster based media device identifier to identify the unidentified media device based on the media devices available at the media locations in the cluster of media locations, and a media device report generator to generate a report on the identity of the unidentified media device.

18 Claims, 8 Drawing Sheets

(51) Int. Cl.
*H04N 21/258* (2011.01)
*H04N 21/2547* (2011.01)
*H04N 21/658* (2011.01)
*H04H 60/00* (2009.01)
*H04N 21/435* (2011.01)
*H04N 21/8358* (2011.01)
*H04N 21/84* (2011.01)
*H04H 60/29* (2008.01)

(52) U.S. Cl.
CPC ... *H04N 21/2547* (2013.01); *H04N 21/25866* (2013.01); *H04N 21/435* (2013.01); *H04N 21/44222* (2013.01); *H04N 21/6582* (2013.01); *H04N 21/8358* (2013.01); *H04N 21/84* (2013.01); *H04H 60/29* (2013.01)

(56) References Cited

U.S. PATENT DOCUMENTS

| | | | |
|---|---|---|---|
| 8,244,527 | B2 | 8/2012 | Srinivasan et al. |
| 9,106,953 | B2 | 8/2015 | McMillan |
| 9,369,762 | B2 | 6/2016 | Falcon |
| 9,438,939 | B2 | 9/2016 | Wright et al. |
| 9,485,525 | B1* | 11/2016 | Oztaskent ........ H04N 21/23109 |
| 10,152,989 | B1* | 12/2018 | Brown .................... G10L 25/72 |
| 10,349,208 | B1* | 7/2019 | Liang .................... H04L 67/18 |
| 2008/0126420 | A1* | 5/2008 | Wright ................. H04N 21/845 |
| 2012/0226791 | A1* | 9/2012 | Ramaswamy .......... H04L 41/12 |
| | | | 709/223 |
| 2013/0159499 | A1* | 6/2013 | Besehanic ........... H04L 61/1511 |
| | | | 709/224 |
| 2015/0193813 | A1* | 7/2015 | Toupet .................. G06Q 50/01 |
| | | | 705/14.41 |
| 2016/0048868 | A1* | 2/2016 | Mirisola ........... G06Q 30/0245 |
| | | | 705/14.44 |
| 2016/0119672 | A1 | 4/2016 | Alonso et al. |
| 2016/0156972 | A1* | 6/2016 | Oztaskent ........ H04N 21/44222 |
| | | | 725/14 |
| 2018/0191593 | A1* | 7/2018 | De Knijf ................ G06F 21/56 |
| 2018/0203917 | A1* | 7/2018 | Marshall ............... G06F 16/217 |

OTHER PUBLICATIONS

International Searching Authority, "Written Opinion," issued in connection with International Patent Application No. PCT/US2018/046058, dated Nov. 28, 2018, 4 pages.

\* cited by examiner

| MEDIA LOCATION IDENTIFIER | MEDIA IDENTIFIER | MEDIA DEVICE A | MEDIA DEVICE B | MEDIA DEVICE C | MEDIA DEVICE D |
|---|---|---|---|---|---|
| MEDIA LOCATION A | ABC-123 XX-YYYY | PS4 | *ROKU* | BLU-RAY PLAYER | SET TOP BOX |
| MEDIA LOCATION B | 111-XYZ XX-YYYY | SWITCH | SET TOP BOX | *ROKU* | N/A |
| MEDIA LOCATION C | ABC-123 111-XYZ XX-YYYY | *ROKU* | APPLE TV | DVD PLAYER | UNKNOWN DEVICE |

FIG. 5

METHODS AND APPARATUS OF MEDIA DEVICE DETECTION FOR MINIMALLY INVASIVE MEDIA METERS

FIELD OF THE DISCLOSURE

This disclosure relates generally to media metering and, more particularly, to methods and apparatus of media device detection for minimally invasive media meters.

BACKGROUND

Media producers, media providers, advertisers, product manufactures represented in advertisements, and many other entities utilize information about the presentation of media. Such information is often collected through the use of panels comprised of persons (e.g., panelists) who have agreed to have their exposure to media monitored. For example, audio of media may be transmitted with identifying information (e.g., embedded watermarks or codes) that identifies the media. Panelists may be supplied with meters (e.g., portable meters carried and/or worn by the panelists) that collect the audio and extract the identifying information. The information may be transmitted to a collection facility where the results from multiple panelists are combined to generate reports comprising information about media presentation.

BRIEF DESCRIPTION OF THE DRAWINGS

FIG. 5 is an example table listing the media identifiers received in addition to the media devices available at each of the media locations at the media location cluster illustrated in FIG. 4.

DETAILED DESCRIPTION

Figure 1:
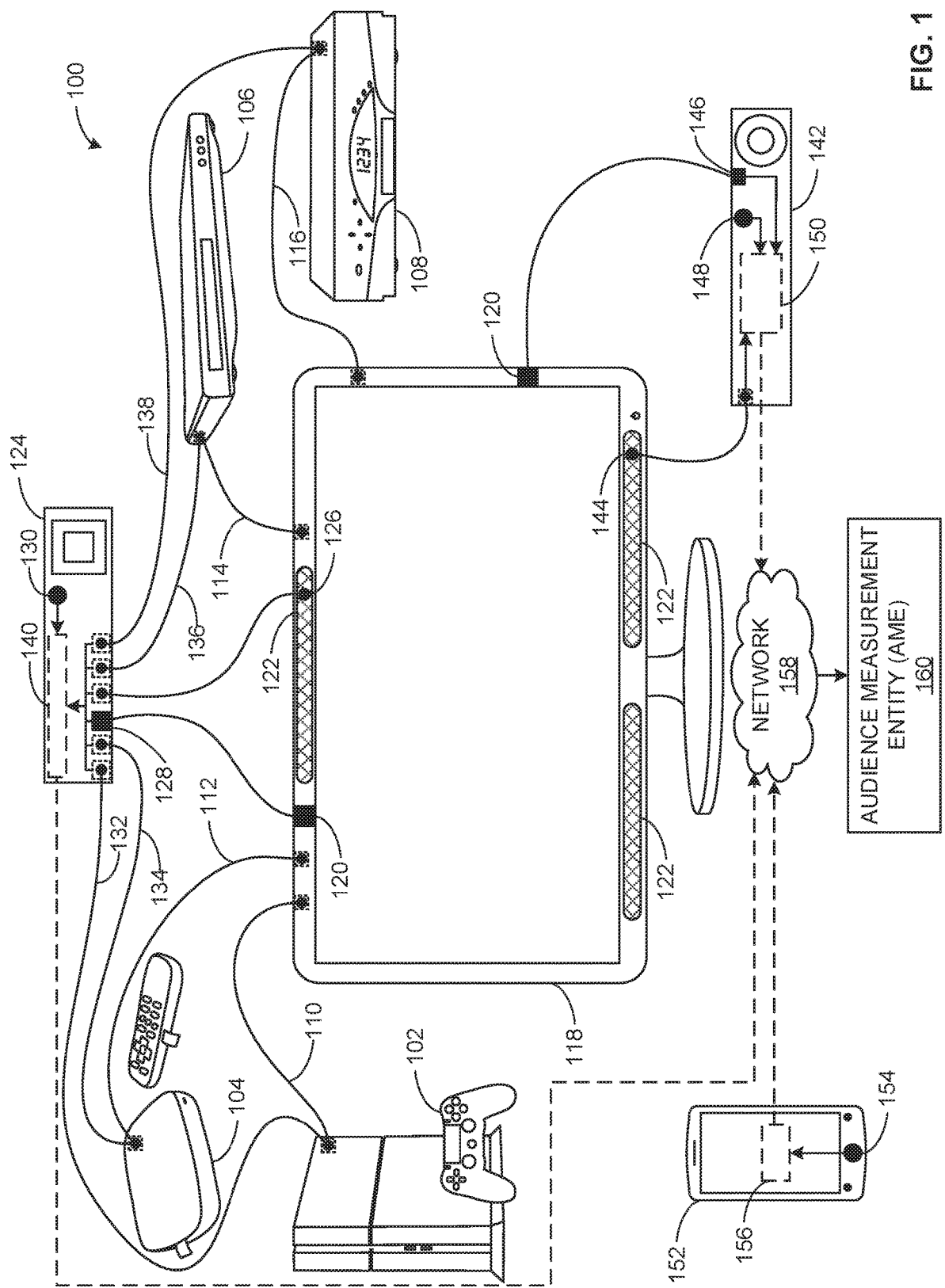
FIG. 1 is an example environment in which a system for detecting a media device with a minimally invasive media meter constructed with the teaching of this disclosure operates.

In the field of media metering, media is identified utilizing a media meter to detect one or more audio or video characteristics (e.g., one or more audio or video identifiers) of a media presentation and further mapping (e.g., matching) the one or more characteristics to identifying information (e.g., a program, an episode, a presentation period, etc.) of the media presentation. As used herein, the term "media" and "media presentation" are defined to mean the same and can include any type of video and/or audio content and/or advertisement delivered via any type of distribution medium. Thus, media includes television programming or advertisements, radio programming or advertisements, movies, web sites, streaming media, etc. Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox One®, Nintendo® Switch, PlayStation® 4), tablet computers (e.g., an iPad®), digital media players (e.g., a Roku® media player, a Slingbox®, an Apple TV®, etc.), etc.

In some examples, media monitoring information is aggregated to determine ownership and/or usage statistics of media devices, relative rankings of usage and/or ownership of media devices, types of uses of media devices (e.g., whether a device is used for browsing the Internet, streaming media from the Internet, etc.), and/or other types of media device information. In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a panelist identifier, a username, etc.).

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s)

representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

Additionally, determining an identifier of a media device which presented media at a media location is important for proper media crediting. In the past, identifying a media device that presented media at a media location was accomplished utilizing media meters that included direct connections to one or more media devices at a media location. However, the quantity of connections required by this configuration was oftentimes found to be intrusive, and additionally relied upon an individual at the media location to ensure proper connections between the meter and each media device at the media location.

To overcome the aforementioned limitations, newer models of media meters are designed to function with a minimal amount of wired connections (e.g., minimally invasive media meters). Some examples of minimally invasive media meters only include a direct connection to the audio line output of a media presentation device, and acquire the remainder of media monitoring information via one or more microphones. Other examples of minimally invasive media meters don't include any direct connections (e.g., a wireless media meter), and acquire all media monitoring information via one or more microphones.

For the example minimally invasive media meters described above, a media device identifier can oftentimes be determined from media monitoring information received via at least one of a microphone and an audio line output of a presentation device. However, in some instances, a minimally invasive media meter may be unable to determine a media device identifier directly from media monitoring information. As used herein, a media device without a determined identifier is further defined as an "unidentified media device."

Methods and apparatus disclosed herein facilitate inferring an identifier of an unidentified media device presenting media when a minimally invasive media meter is utilized and a media device identifier cannot be directly determined from media monitoring information, wherein inferring a media device identifier for the unidentified media device further includes analyzing data from a set of media meters as a reference.

Turning to the figures, FIG. 1 is an illustrated example environment of use 100 in which the teachings of this disclosure operate. The example environment of use 100 includes media devices 102, 104, 106, and 108 which can deliver a media presentation via media transmitters 110, 112, 114, and 116 to a presentation device 118. The presentation device 118 can, in some examples, include one or more audio signal transmitters 120 and one or more speakers 122. Further, the example environment of use 100 can include a wired media meter 124 which can, in some examples, include a microphone 126, an audio signal receiver 128, an ambient microphone 130, one or more media device connectors 132, 134, 136, and 138 capable of providing direct connectivity of the wired media meter 124 to the media devices 102, 104, 106, and 108, and a metering handler 140. Additionally or alternatively, the example environment of use 100 can include a minimally invasive media meter 142 which can, in some examples, include a microphone 144, an audio signal receiver 146, an ambient microphone 148, and a metering handler 150. Additionally or alternatively, the example environment of use 100 can include a wireless media meter 152 which can, in some examples, include a microphone 154, and a metering handler 156. Further, the example environment of use 100 includes a network 158, and an Audience Measurement Entity (AME) 160.

The example media devices 102, 104, 106, and 108 of the illustrated example of FIG. 1 are devices that retrieve media for presentation. In some examples, one or more of the example media devices 102, 104, 106, and 108 are capable of directly presenting media (e.g., via a display) while, in other examples, one or more of the media devices 102, 104, 106, and 108 present the media on a separate presentation device 118, via one or more media transmitters 110, 112, 114, and 116. Thus, as used herein "media devices" may or may not be able to present media without assistance from a second device. Media devices are typically consumer electronics.

For example, the example media device 102 of the illustrated example of FIG. 1 is a PlayStation 4, the example media device 104 of the illustrated example of FIG. 1 is a Roku® media player, the example media device 106 of the illustrated example of FIG. 1 is a Blu-ray/DVD player, and the example media device 108 of the illustrated example of FIG. 1 is a set top box. The illustrated example media devices 102, 104, 106, and 108 are not capable of directly presenting media (e.g., via an integrated and/or connected display and speakers), and thus, will each present media on the example presentation device 118. While in the illustrated example of FIG. 1, a PlayStation 4, a Roku®, media player, a Blu-ray/DVD player, and a set top box are shown, any other type(s) and/or number(s) of media device(s) may additionally or alternatively be used. For example. Internet-enabled mobile handsets (e.g., a smartphone, an iPod®, etc.), video game consoles (e.g., Xbox®, PlayStation® 4, etc.), tablet computers (e.g., an iPad®, a Samsung Galaxy Tab S3®, etc.), digital media players (e.g., a Roku® media player, a Slingbox®, a Tivo®, etc.), smart televisions, desktop computers, laptop computers, servers, etc. may be used. Additionally, while each of the media devices 102, 104, 106, and 108 in the illustrated example of FIG. 1 are known media devices, one or more of the media devices 102, 104, 106, and/or 108 can be, in some examples, unknown media devices.

The example media transmitters 110, 112, 114, and 116 of the illustrated example of FIG. 1 are devices that transmit media from the example media devices 102, 104, 106, and 108 to the example presentation device 118. The example media transmitters 110, 112, 114, and 116 can transmit one or more audio signals to the presentation device 118. Additionally or alternatively, the media transmitters 110, 112, 114, and 116 can transmit one or more video signals to the presentation device 118. Additionally or alternatively, the media transmitters 110, 112, 114, and 116 can transmit one or more video signals and one or more audio signals to the presentation device 118.

In some examples, such as in the illustrated example of FIG. 1, the media transmitters 110, 112, 114, and 116 can transmit media to the presentation device 118 via a wired/physical connection, such as an HDMI cable, an RCA cable, an optical cable, a coaxial cable, and/or any physical cable capable of transmitting at least one of a video signal and audio signal. Additionally or alternatively, the media transmitters 110, 112, 114, and/or 116 can transmit media to the presentation device 118 via a wireless connection such as a Bluetooth connection, a cellular connection such as a Global System for Mobile Communications (GSM), a Long Term Evolution (LTE), etc., a Wi-Fi connection, and/or any wireless protocol capable of transmitting at least one of a video signal and audio signal.

The example presentation device 118 of the illustrated example of FIG. 1 is a device capable of presenting media distributed by one or more of the example media devices 102, 104, 106, and 108 further connected to the presentation device 118 by one or more media transmitters 110, 112, 114, and 116. The example presentation device 118 can present a video signal from one or more of the example media devices 102, 104, 106, and 108. Additionally or alternatively, the presentation device 118 can present an audio signal from one or more of the example media devices 102, 104, 106, and 108. Additionally or alternatively, the presentation device 118 can present both an audio signal and a video signal from one or more of the example media devices 102, 104, 106, and 108. Further, the example presentation device 118 can include the one or more audio signal transmitters 120 and the one or more speakers 122.

The one or more audio signal transmitters 120 of the illustrated example of FIG. 1 are devices capable of transmitting an audio signal matching the audio signal received by the presentation device 118, as distributed by one or more of the media devices 102, 104, 106, and 108.

In some examples, such as in the illustrated example of FIG. 1, the one or more audio signal transmitters 120 can transmit an audio signal to at least one of the wired media meter 124 and the minimally invasive media meter 142 via a wired/physical connection, such as an HDMI cable, an RCA cable, an optical cable, a coaxial cable, and/or any physical cable capable of transmitting an audio signal. Additionally or alternatively, the audio signal transmitter 120 can transmit an audio signal to at least one of the wired media meter 124 and the minimally invasive media meter 142 via a wireless connection such as a Bluetooth connection, a cellular connection such as a Global System for Mobile Communications (GSM), a Long Term Evolution (LTE), etc., a Wi-Fi connection, and/or any wireless protocol capable of transmitting an audio signal.

The one or more speakers 122 of the illustrated example of FIG. 1 are devices capable of outputting the audio signal distributed by one or more of the media devices 102, 104, 106, and 108. In some examples, the audio signal output by the one or more speakers 122 can be observed by a human viewer of the media presented by the presentation device 118. Additionally or alternatively, the audio signal output by the one or more speakers 122 can be observed by a microphone and/or any electromechanical device capable of audio detection. Additionally or alternatively, the audio signal output by the one or more speakers 122 can be observed by at least one of a human viewer of the media presentation, and by a microphone and/or any electromechanical device capable of receiving auditory signals.

Further, in some such examples, the audio signal output by the one or more speakers 122 can include an audio watermark detectable by a microphone and/or any electromechanical device capable of audio detection, but not detectable by a human viewer of the media presented by the presentation device 118. Additionally or alternatively, the audio signal output by the one or more speakers 122 can include a fingerprint or signature detectable by a microphone and/or any electromechanical device capable of audio detection. Additionally or alternatively, the audio signal output by the one or more speakers 122 can include any media identifier detectable by a microphone and/or any electromechanical device capable of audio detection.

The example wired media meter 124 of the illustrated example of FIG. 1 is a device capable of detecting the presentation of media distributed by at least of one of the media devices 102, 104, 106, and 108 by the presentation device 118. In some examples, such as the illustrated example of FIG. 1, the wired media meter 124 can further include or otherwise implement the microphone 126, the audio signal receiver 128, the ambient microphone 130, the one or more media device connectors 132, 134, 136, and 138, and the metering handler 140.

The microphone 126, which in some examples is included in or otherwise implemented by the wired media meter 124, is a device capable of capturing audio (e.g., sound). In the illustrated example of FIG. 1, the microphone 126 captures audio output by the one or more speakers 122, included or otherwise implemented by the presentation device 118. The example microphone 126 can be placed in close proximity to the presentation device 118. In the illustrated example of FIG. 1, the microphone 126 is placed in direct contact with the speaker 122.

Further, in some examples, the microphone 126 can receive a media identifier included in an audio signal of a media presentation presented at the presentation device 118.

The audio signal receiver 128, which in some examples is included in or otherwise implemented by the wired media meter 124, is a device capable of receiving an audio signal matching the audio signal distributed by one or more of the media devices 102, 104, 106, and/or 108, and further transmitted by the audio signal transmitter 120. Further, in some examples, the audio signal received by the audio signal receiver 128 can include a media identifier of the media presented by the presentation device 118.

In some examples, such as in the illustrated example of FIG. 1, the audio signal receiver 128 can receive an audio signal from the presentation device 118 via a wired/physical connection, such as an HDMI cable, an RCA cable, an optical cable, a coaxial cable, and/or any physical cable capable of transmitting an audio signal. Additionally or alternatively, the audio signal receiver 128 can receive an audio signal from the presentation device 118 via a wireless connection such as a Bluetooth connection, a cellular connection such as a Global System for Mobile Communications (GSM), a Long Term Evolution (LTE), etc., a Wi-Fi connection, and/or any wireless protocol capable of transmitting an audio signal.

The ambient microphone 130, which in some examples is included in or otherwise implemented by the wired media meter 124, is a device capable of detecting ambient sound near the wired media meter 124. As used herein, "ambient sound" is defined as sound (e.g., audio) from any example source other than the presentation device 118. Further, the ambient microphone 130 can, in some examples, transmit one or more ambient sound signals to the metering handler 140.

The one or more media device connectors 132, 134, 136, and 138 can be, in some examples, included in or otherwise implemented by the wired media meter 124. The one or more media device connectors 132, 134, 136, and 138 are devices capable of transmitting a media device identifier of a media device, in some examples one or more of media devices 102, 104, 106, and 108 of the illustrated example of FIG. 1, from one or more of the media devices 102, 104, 106, and/or 108 to the wired media meter 124. Additionally or alternatively, the one or more media device connectors 132, 134, 136, and 138 can transmit a media identifier from one or more of the media devices 102, 104, 106, and 108 to the wired media meter 124.

The metering handler 140, which in some examples is included in or otherwise implemented by the wired media meter 124, is a device capable of handling one or more audio signals, wherein some examples the one or more audio signals can further include a media identifier. In the illustrated example of FIG. 1, audio signals can be received by at least one of the microphone 126, the audio signal receiver 128, the ambient microphone 130, and the one or more media device connectors 132, 134, 136, and 138.

In some examples, handling one or more audio signals can further include combining or otherwise multiplexing the one or more audio signals. Additionally or alternatively, handling one or more audio signals can further include determining a subset of audio signals which include a media identifier. Additionally or alternatively, handling one or more audio signals can include extracting a media identifier from one or more audio signals.

In some examples, the metering handler 140 is further to at least one of determine and distribute media monitoring information based upon identifiers (e.g., a media identifier, a media device identifier, etc.) received. In such examples, media monitoring information can include, but is not limited to, application usage information (e.g., an identifier of an application, a time and/or duration of use of the application, a rating of the application, etc.), media identifying information, and/or user-identifying information (e.g., demographic information, a panelist identifier, a username, etc.).

The example minimally invasive media meter 142 of the illustrated example of FIG. 1 is a device capable of detecting the presentation of media, distributed by at least of one of the media devices 102, 104, 106, and 108, at the presentation device 118. In some examples, such as the illustrated example of FIG. 1, the minimally invasive media meter 142 can further include or otherwise implement the microphone 144, the audio signal receiver 146, the ambient microphone 148, and the metering handler 150. In some examples, the microphone 144, the audio signal receiver 146, the ambient microphone 148, and the metering handler 150 function pursuant to the teachings of the microphone 126, the audio signal receiver 128, the ambient microphone 130, and the metering handler 140, respectively, described above in conjunction with the wired media meter 124.

Additionally, the example minimally invasive media meter 142 of the illustrated example of FIG. 1 does not, in some examples, include direct connections to any one or more of the media devices 102, 104, 106, and 108.

The example wireless media meter 152 of the illustrated example of FIG. 1 is a device capable of detecting the presentation of media distributed by at least of one of the media devices 102, 104, 106, and 108 by the presentation device 118. In some examples, such as the illustrated example of FIG. 1, the wireless media meter 152 can further include or otherwise implement the microphone 154, and the metering handler 156. In some examples, the microphone 154 functions pursuant to the combination of the teachings of the microphone 126, and the ambient microphone 130, described in conjunction with the wired media meter 124. Additionally, the metering handler 156 functions pursuant to the teaching of the metering handler 140, described in conjunction with the wired media meter 124.

Additionally, the example wireless media meter 152 of the illustrated example of FIG. 1 does not include direct connections to any of the media devices 102, 104, 106, and 108, or the one or more audio signal transmitters 120.

The example network 158 of the illustrated example of FIG. 1 is the Internet. However, the example network 158 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 158 enables at least one of the wired media meter 124, the minimally invasive media meter 142, and the wireless media meter 152 to be in communication with the example Audience Measurement Entity (AME) 160. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time events.

Figure 2:
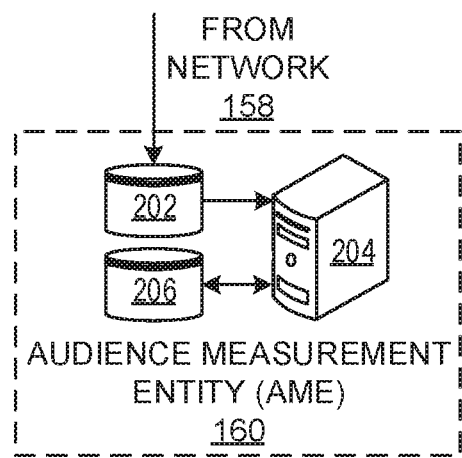
FIG. 2 is a block diagram of an example implementation of the audience measurement entity (AME) of FIG. 1.

The example Audience Measurement Entity (AME) 160 of the illustrated example of FIG. 1, described in further detail below in conjunction with FIG. 2, is a device capable of at least one of analyzing media monitoring information of a media presentation detected and distributed by at least one of the wired media meter 124, the minimally invasive media meter 142, and the wireless media meter 152. Further, the Audience Measurement Entity (AME) 160 can generate a media credit for the media presentation presented at the presentation device 118.

In operation of the example environment of use 100 of FIG. 1, a media presentation is distributed from one or more of the media devices 102, 104, 106, and 108 via one or more of the media transmitters 110, 112, 114, and 116 to the presentation device 118. The audio signal of the media presentation is further output via the one or more audio signal transmitters 120 and the one or more speakers 122, and received by at least one of the microphones 126, 144, and/or 154 and at least one of the audio signal receivers 128 and 146 of at least one of the wired media meter 124, the minimally invasive media meter 142, and the wireless media meter 152. Additionally, the wired media meter 124 receives a media device identifier from at least one of the media devices 102, 104, 106, and 108 via one or more of the media device connectors 132, 134, 136, and 138. In response to the receipt of one or more audio signals, one or more of the metering handlers 140, 150, and 156 distribute at least one of the audio signals and media monitoring information to the Audience Measurement Entity (AME) 160 via the network 158.

FIG. 2 is an illustrated example block diagram further detailing the Audience Measurement Entity (AME) 160 which can, in some examples, include a media database 202, a media device analyzer 204, and a media crediting database 206.

In the illustrated example of FIG. 2, the example Audience Measurement Entity (AME) 160 includes the media database 202 which is capable of storing media monitoring information as distributed by at least one of the wired media meter 124, the minimally invasive media meter 142, and the wireless media meter 152.

The media database 202 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The media database 202 may additionally or alternatively be implemented by one or more double data rate (DDR) memories, such as DDR, DDR2, DDR3, DDR4, mobile DDR (mDDR), etc. The media database 202 may additionally or alternatively be implemented by one or more mass storage devices such as hard disk drive(s), compact disk drive(s) digital versatile disk drive(s), etc. While in the illustrated example the media database 202 is illustrated as a single database, the media database 202 may be implemented by any number and/or type(s) of databases. Furthermore, the data stored in the media database 202 may be in any data format such as, for example, binary data, comma delimited data, tab delimited data, structured query language (SQL) structures, etc.

Figure 3:
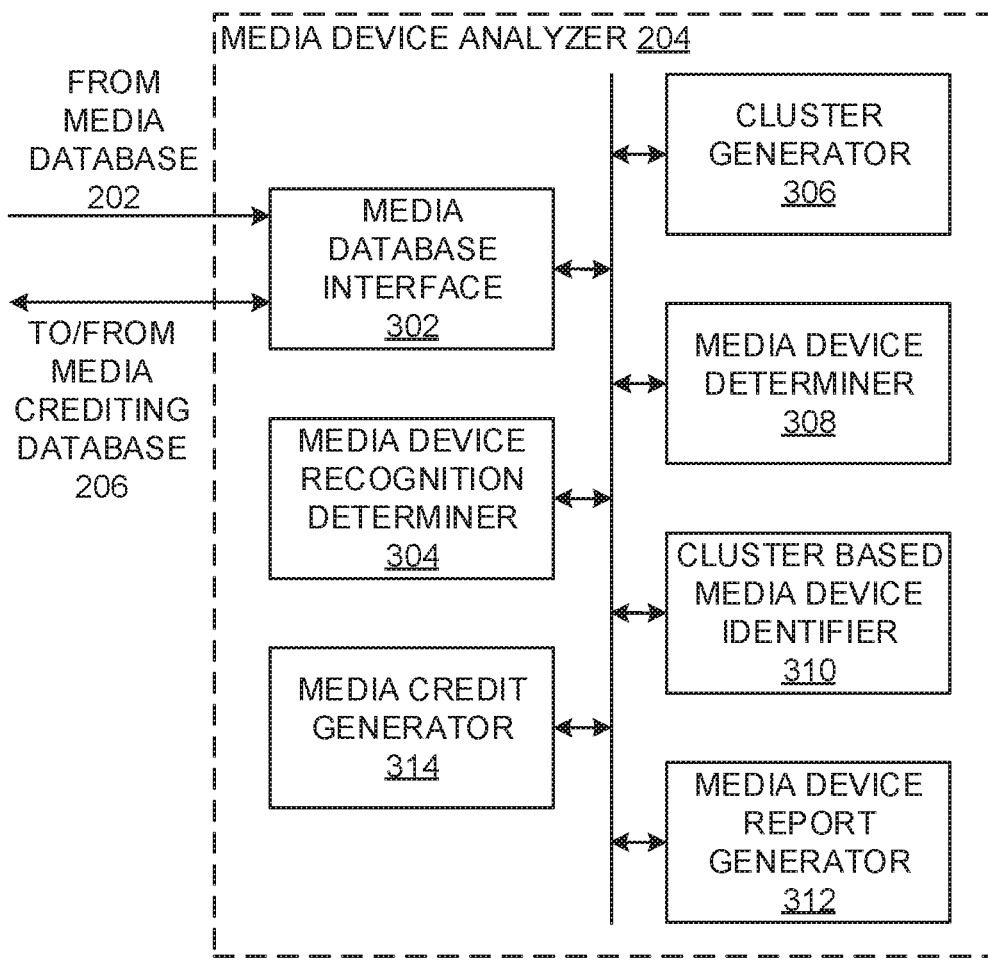
FIG. 3 is a block diagram of an example implementation of the media device analyzer of FIG. 2.

The media device analyzer 204 of the illustrated example of FIG. 2, described in greater detail below in conjunction with FIG. 3, is a device capable of at least one of identifying (e.g., determining an identity of) an unidentified media device, generating a report on the media device identified, and generating a credit for the media device identified utilizing media monitoring information stored in the media database 202.

In the illustrated example of FIG. 2, the Audience Measurement Entity (AME) 160 includes the media crediting database 206 which is capable of storing one or more media credit(s) for one or more media presentation(s) as detected by at least one of the wired media meter 124, the minimally invasive media meter 142, and the wireless media meter 152 at the example environment of use 100. Additionally or alternatively, the media crediting database 206 is capable of storing one or more media credit(s) for one or more media presentation(s).

The media crediting database 206 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The media crediting database 206 may additionally or alternatively be implemented by one or more double data rate (DDR) memories, such as DDR, DDR2, DDR3, DDR4, mobile DDR (mDDR), etc. The media crediting database 206 may additionally or alternatively be implemented by one or more mass storage devices such as hard disk drive(s), compact disk drive(s), digital versatile disk drive(s), etc. While in the illustrated example the media crediting database 206 is illustrated as a single database, the media crediting database 206 may be implemented by any number and/or type(s) of databases. Furthermore, the data stored in the media crediting database 206 may be in any data format such as, for example, binary data, comma delimited data, tab delimited data, structured query language (SQL) structures, etc.

In operation, the example block diagram of the illustrated example of FIG. 2 receives media monitoring information, including media identifying information, via the network 158 at the media database 202, further included or otherwise implemented by the Audience Measurement Entity (AME) 160. The media database 202 at least one of stores the media monitoring information and distributes the media monitoring information to the media device analyzer 204, which is further to at least one of identify an unidentified media device for the media presentation and generate a media credit including the identifier of the media device. The media device analyzer 204 is further to distribute the media credit to the media crediting database 206, wherein the media credit is stored.

An example block diagram further detailing the media device analyzer 204 of FIG. 2 is illustrated in the example of FIG. 3. The example media device analyzer 204 of FIG. 3 can, for a media presentation detected by at least one of the wired media meter 124, the minimally invasive media meter 142, and the wireless media meter 152, identify a media device which presented the media presentation and, in some examples, further generate a credit for the media presentation including an identifier of the media device.

Looking to FIG. 3, the illustrated media device analyzer 204 includes a media database interface 302, a media device recognition determiner 304, a cluster generator 306, a media device determiner 308, a cluster based media device identifier 310, a media device report generator 312, and a media credit generator 314.

In the illustrated example of FIG. 3, the example media database interface 302 can at least one of transfer data to and receive data from at least one of the example media database 202 and the example media crediting database 206. Additionally or alternatively, the example media database interface 302 can at least one of transfer data to and receive data from any component of the media device analyzer 204 that can include the media device recognition determiner 304, the cluster generator 306, the media device determiner 308, the cluster based media device identifier 310, the media device report generator 312, and the media credit generator 314. In some examples, the media database interface 302 can be implemented by any type of interface standards, such as an Ethernet interface, a universal serial bus (USB), and/or a PCI express interface.

The example media device recognition determiner 304, further included in the media device analyzer 204 of the illustrated example of FIG. 2, is a device capable of determining an identifier of an unidentified media device presenting a media presentation (e.g., the previously unidentified media device is a Roku the previously unidentified media device is a PlayStation 4, the previously unidentified media device is a Set Top Box, the previously unidentified media device is unrecognized, etc.). In some examples, such as the illustrated example of FIG. 1, a media device identifier can be transmitted to the wired media meter 124 directly from a media device via a media device connector, such as one of media devices 102, 104, 106, and 108 via one of the media device connectors 132, 134, 136, and 138 in the illustrated example of FIG. 1.

Additionally or alternatively, such as in the illustrated example of FIG. 1, a media device identifier can be determined from a media identifier transmitted to at least one of the audio signal receiver 128 of the wired media meter 124 and the audio signal receiver 146 of the minimally invasive media meter 142 via the audio signal transmitter 120 of the presentation device 118.

Additionally or alternatively, such as in the illustrated example of FIG. 1, a media device identifier can be determined from a media identifier transmitted to at least one of the microphone 126 of the wired media meter 124, the microphone 144 of the minimally invasive media meter 142, and the microphone 154 of the wireless media meter 152 via audio output of the one or more speakers 122 of the presentation device 118.

When, in some examples, the media device recognition determiner 304 determines that an identifier of the unidentified media device cannot be determined from available media identifying information, the media device recognition determiner 304 is further to transmit media identifying information of a media presentation to the cluster generator 306.

The example cluster generator 306, further included in the media device analyzer 204 of the illustrated example of FIG. 2, is a device capable of generating one or more clusters of one or more media locations from a population of media locations (e.g., a reference population of media locations). As used herein, "cluster of media locations" and "media location cluster" are used interchangeably and are defined to mean a subset of media locations (e.g., one or more media locations from a population of media locations which are grouped together based upon one or more rulesets). In some examples, the cluster generator 306 generates a cluster of media locations from a population of media locations by identifying one or more media locations from the population of media locations that received an example media identifier (e.g., media identifier ABC-123, media identifier XX-YYYY, etc.) included in media identifying information.

Additionally or alternatively, the cluster generator 306 can generate a cluster of media locations from a population of media locations by determining one or more media locations from the population of media locations that include an example media device (e.g., a PlayStation 4, a Roku, etc.). Additionally or alternatively, the cluster generator 306 can generate a cluster of media locations from a population of media locations by determining one or more media locations from the population of media locations that received media identifying information at a substantially similar time (e.g., 7:22 PM).

Additionally or alternatively, the example cluster generator 306 can determine a media location identifier (e.g., media location A, media location B, media location C, etc.) for each media location determined to be included at the media location cluster and, in some examples, further distribute a media location ID of each media location in an example media location cluster to at least one of the media device determiner 308 and the cluster based media device identifier 310.

The example media device determiner 308, further included in the media device analyzer 204 of the illustrated example of FIG. 2, is a device capable of determining a list of media devices available at a media location (e.g., a media device list, a media device set, an available media device list, an available media device set, etc.). From the illustrated example of FIG. 1, the example media device determiner 308 would determine the example environment of use 100 to include a PlayStation 4, a Roku, a Blu-Ray Player, and a Set Top Box. In some examples, the media device determiner 308 is to determine a list of media devices available at each media location of the example media location cluster as generated by the example cluster generator 306. Further, the list of media devices available at each media location of the example media location cluster can, in some examples, be associated with the media location ID of each media location of the example media location cluster as distributed by the example cluster generator 306.

In some examples, the list of media devices available at a media location can be determined at the time of installation of an example media meter in an example media location. In such examples, the list of media devices can be determined by a survey completed by the panelist. Additionally or alternatively in such examples, the list of media devices can be determined by a technician installing the example media meter at the example media location.

Additionally or alternatively, in response to an example media location including an example wired media meter, in some examples the wired media meter 124 of the illustrated example of FIG. 1, the list of media devices available at a media location can be determined by one or more media device connectors, in some examples the media device connectors 132, 134, 136, and 138 of the illustrated example of FIG. 1, directly connected to one or more media devices, in some examples the media devices 102, 104, 106, and 108 of the illustrated example of FIG. 1. Additionally or alternatively, the list of media devices at a media location can be determined by media identifying information received by an example media meter, in some examples such as the illustrated example of FIG. 1, at least one of the wired media meter 124, the minimally invasive media meter 142, and the wireless media meter 152.

The example cluster based media device identifier 310, further included in or otherwise implemented by the media device analyzer 204 of the illustrated example of FIG. 2, is a device capable of determining an identifier of a media device for a media presentation based upon at least one of the media location cluster as generated by the cluster generator 306, and the one or more media device lists (e.g., media device lists, media device sets, available media device lists, available media device sets, etc.) as generated by the media device determiner 308. In some examples, the cluster based media device identifier 310 can determine an identifier of a media device for a media presentation based upon a ruleset applied to the one or more media device lists generated for the media location cluster.

The ruleset applied by the cluster based media device identifier 310 can be further defined by determining whether one or more media device(s) are available (e.g., one or more media device(s) are listed in a media device list as generated by the media device determiner 308) at each media location of the media location cluster generated by the cluster generator 306.

Additionally or alternatively, the ruleset applied by the cluster based media device identifier 310 can be further defined by determining whether one or more media device(s) are available in a majority of media locations of the media location cluster generated by the cluster generator 306. In some examples, "majority" can be further defined as greater than 50% of the media locations at the media location cluster.

Additionally or alternatively, the ruleset applied by the cluster based media device identifier 310 can be further defined by determining whether one or more media device(s) are available in at least a selected proportion of media locations (e.g., 30% of media locations, 40% of media locations, 60% of media locations, 80% of media locations, etc.) of the media location cluster generated by the cluster generator 306.

In some examples, in response to two or more media devices satisfying the ruleset applied by the cluster based media device identifier 310, the cluster based media device identifier 310 can further determine the media device available in the greatest proportion of media locations of the media location cluster from the two or more media devices satisfying the ruleset.

In some examples, in response to no media devices satisfying the ruleset applied by the cluster based media device identifier 310, the cluster based media device identifier 310 can further determine the media device available in the greatest proportion of media locations.

The example media device report generator 312, further included in the media device analyzer 204 of the illustrated example of FIG. 2, prepares one or more media measurement report(s) indicative of the exposure of media on media devices. In some examples, the media device report generator 312 can generate a report indicating an identifier of a media device determined to be presenting media.

Additionally or alternatively, the media device report generator 312 can generate a report indicating whether a media device identifier was determined from at least one of media identifying information or from a ruleset applied to a cluster of media locations by the cluster based media device identifier 310.

Additionally or alternatively, the media device report generator 312 can generate a report indicating at least one of an identifier of a media device determined to be presenting media and the proportion of media locations at the media location cluster the identified media device is determined to be available in.

Additionally or alternatively, the media device report generator 312 can generate a report indicating one or more media location identifiers of one or more media locations determined to be at a media location cluster by the cluster generator 306.

Additionally or alternatively, the media device report generator 312 can generate a report indicating one or more media device lists, generated by the media device determiner 308, for one or more media locations determined to be at a media location cluster by the cluster generator 306.

Additionally or alternatively, the media device report generator 312 can generate a report pertaining to any output of at least one of the media device recognition determiner 304, the cluster generator 306, the media device determiner 308, and the cluster based media device identifier 310.

The example media credit generator 314, further included in the media device analyzer 204 of the illustrated example of FIG. 2, is a device capable of generating media measurement credits indicative of the presentation of media on media devices. In some examples, the media credit generator 314 can further distribute the one or more media measurement credit(s) generated to the media crediting database 206 via the media database interface 302.

In some examples, in response to the media device recognition determiner 304 determining a media device identifier from media identifying information received by the media database interface 302, the media credit generator 314 can generate a media credit including the media device identifier.

Additionally or alternatively, in response to the cluster based media device identifier 310 determining a media device identifier from a ruleset applied to one or more media device lists generated by the media device determiner 308, for one or more media locations of a media location cluster generated by the cluster generator 306, the media credit generator 314 can generate a media credit including the media device identifier.

In operation, the media device analyzer 204 of the illustrated example of FIG. 3 receives media monitoring information, further including media identifying information, of a media presentation via the media database interface 302, and is further to transmit the media monitoring information to the media device recognition determiner 304. The media device recognition determiner 304 determines whether the media device can be identified from media identifying information received from the media database interface 302. In response to determining the identifier for the media device with media identifying information, the media device recognition determiner 304 is further to distribute the media device identifier to at least one of the media device report generator 312 and the media credit generator 314. In such examples, the media device report generator 312 is further to generate a report on the media device identifier and the media credit generator is further to generate a credit for the media device identifier.

In response to determining the media device cannot be determined with media identifying information, the media device recognition determiner 304 is further to distribute a media identifier, included in or otherwise implemented by media identifying information, to the cluster generator 306. Further, the cluster generator 306 is to identify one or more media locations from a population of media locations which received a media identifier matching the media identifier distributed by the network 158 and received by the media device analyzer 204 via the media database interface 302, and generate a media location cluster including the one or more media locations identified. The cluster generator 306 is further to distribute the generated media location cluster to the media device determiner 308 and the cluster based media device identifier 310, wherein the media device determiner 308 is to determine a list of media devices (e.g., a media device list) available at each media location included in the cluster of media locations. The media device determiner 308 is further to distribute the one or more media device lists to the cluster based media device identifier 310. The cluster based media device identifier 310, having received the media location cluster from the cluster generator 306 and one or more media device lists from the media device determiner 308, is further to determine a media device identifier by applying a ruleset to the one or more media device list(s) and the media location cluster. In response to determining a media device identifier, the cluster based media device identifier 310 is further to distribute the media device identifier to at least one of the media device report generator 312 and the media credit generator 314. In such examples, the media device report generator 312 is further to generate a report on the media device identifier and the media credit generator is further to generate a credit for the media device identifier.

Although the example media device analyzer 204 of the illustrated example of FIG. 3 includes one media database interface 302, one media device recognition determiner 304, one cluster generator 306, one media device determiner 308, one cluster based media device identifier 310, one media device report generator 312, and one media credit generator 314, identification of an unidentified media device as disclosed herein can be used with any number(s) of media database interfaces 302, media device recognition determiners 304, cluster generators 306, media device determiners 308, cluster based media device identifiers 310, media device report generators 312, and media credit generators 314.

Figure 4:
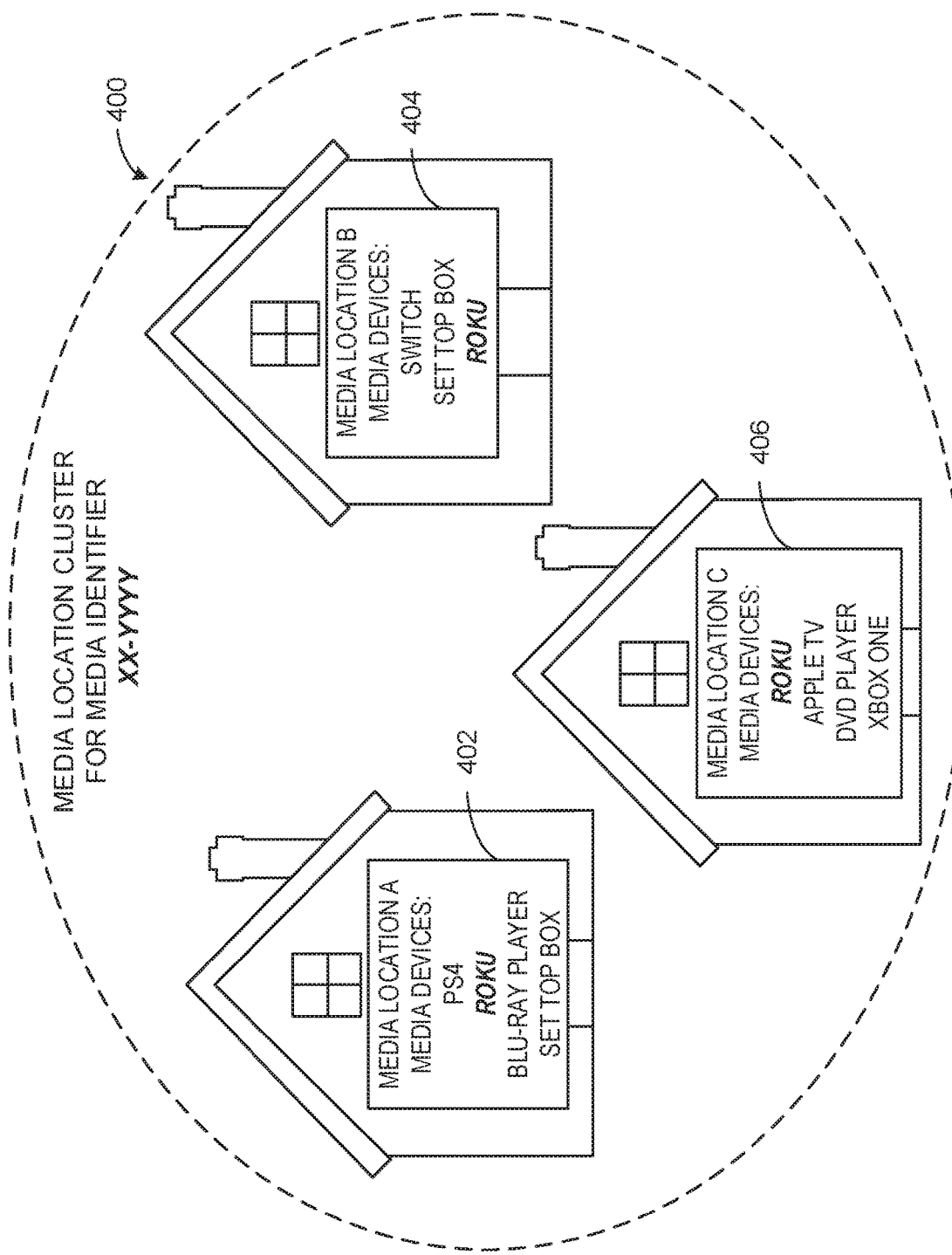
FIG. 4 is an example cluster of media locations, whereat each media location in the cluster of media locations has received an example media identifier XX-YYYY.

FIG. 4 is an illustrated example media location cluster 400 including three example Media locations, illustrated as Media location A 402, Media location B 404, and Media location C 406 in FIG. 4, generated by the cluster generator 306. The example media location cluster 400 can further be defined, as in the illustrated example of FIG. 4, as the media location cluster for an example media identifier "XX-YYYY," further included in media identifying information. While in the illustrated example the example media location cluster 400 is generated based upon a matching media identifier, the example media location cluster 400 can additionally or alternatively be generated based upon a matching media device. Additionally or alternatively, the example media location cluster 400 can be generated based upon matching media providers. Additionally or alternatively, the example media location cluster 400 can be generated based upon matching any one or more aspects of media identifying information.

Further in the illustrated example of FIG. 4, the Media location A 402, the Media location B 404, and the Media location C 406 can include one or more media device(s) as determined by the media device determiner 308. For example, the Media location A 402, previously illustrated as the example environment of use 100, is determined to include a PlayStation 4, a Roku, a Blu-Ray Player, and a Set Top Box. Additionally, the Media location B 404 is determined to include a Nintendo Switch, a Set Top Box, and a Roku. Additionally, the Media location C 406 is determined to include a Roku, an Apple TV, a DVD Player, and an Xbox One.

FIG. 5 illustrates an example report 500 for the example media location cluster 400 generated by the example media device report generator 312 in response to the media device report generator 312 receiving one or more results from at least one of the cluster generator 306, the media device determiner 308, and the cluster based media device identifier 310. The example report 500 of FIG. 5, which can in some examples be output as a data table, includes one or more media location identifiers 502, one or more media identifiers 504, one or more instances of Media Device A 506, one or more instances of Media Device B 508, one or more instances of Media Device C 510, and one or more instances of Media Device D 512. Further, the example report 500 includes one or more data table rows 514, 516, and 518.

In the illustrated example report 500, the example data table row 514 includes the media location identifier 502, in the illustrated example "Media location A" previously illustrated as the example Media location A 402 and the example environment of use 100, the media identifier 504, in the illustrated example "ABC-123" and "XX-YYYY", the example Media Device A 506, in the illustrated example "PS4", the example Media Device B 508, in the illustrated example "Roku", the example Media Device C 510, in the illustrated example "Blu-Ray Player", and the example Media Device D 512, in the illustrated example "Set Top Box".

Additionally in the illustrated example report 500, the example data table row 516 includes the media location identifier 502, in the illustrated example "Media location B" previously illustrated as the example Media location B 404, the media identifier 506, in the illustrated example "111-XYZ" and "XX-YYYY", the example Media Device A 506, in the illustrated example "Switch", the example Media Device B 508, in the illustrated example "Set Top Box", the example Media Device C 510, in the illustrated example "Roku", and the example Media Device D 512, in the illustrated example "N/A", denoting that "Media location B" only includes three (3) media devices.

Additionally in the illustrated example report 500, the example data table row 518 includes the media location identifier 502, in the illustrated example "Media location C" previously illustrated as the example Media location C 406, the media identifier 506, in the illustrated example "ABC-123", "111-XYZ", and "XX-YYYY", the example Media Device A 506, in the illustrated example "Roku", the example Media Device B 508, in the illustrated example "Apple TV", the example Media Device C 510, in the illustrated example "DVD Player", and the example Media Device D 512, in the illustrated example "Unknown Device". Thus, examples disclosed herein can be applied to each of a media location including known devices, a media location including unknown media devices, and a media location including each of known media devices and unknown media devices, such as "Media location C" described above in conjunction with data table row 518.

Utilizing the illustrated example report 500, the cluster based media device identifier 310, described in further detail in conjunction with FIG. 3, can determine "Roku" is available at each media location of the media location cluster 400, "Set Top Box" is available in a majority of media locations of the media location cluster 400, and "Apple TV" is available in a minority of media locations of the media location cluster 400 for an example media identifier "XX-YYYY", described in further detail in conjunction with FIG. 4.

While an example manner of implementing the example media device analyzer 204 of FIG. 2 is illustrated in FIG. 3, one or more of the elements, processes and/or devices illustrated in FIG. 3 may be combined, divided, re-arranged, omitted, eliminated and/or implemented in any other way. Further, the example media database interface 302, the example media device recognition determiner 304, the example cluster generator 306, the example media device determiner 308, the example cluster based media device identifier 310, the example media device report generator 312, and the example media credit generator 314 and/or, more generally, the example media device analyzer 204 of FIG. 3 may be implemented by hardware, software, firmware and/or any combination of hardware, software and/or firmware. Thus, for example, any of the example media database interface 302, the example media device recognition determiner 304, the example cluster generator 306, the example media device determiner 308, the example cluster based media device identifier 310, the example media device report generator 312, and the example media credit generator 314 and/or, more generally, the example media device analyzer 204 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media database interface 302, the example media device recognition determiner 304, the example cluster generator 306, the example media device determiner 308, the example cluster based media device identifier 310, the example media device report generator 312, and the example media credit generator 314 is/are hereby expressly defined to include a non-transitory computer readable storage device or storage disk such as a memory, a digital versatile disk (DVD), a compact disk (CD), a Blu-ray disk, etc. including the software and/or firmware. Further still, the example media device analyzer 204 of FIG. 2 may include one or more elements, processes and/or devices in addition to, or instead of, those illustrated in FIG. 3, and/or may include more than one of any or all of the illustrated elements, processes and devices.

Figure 6:
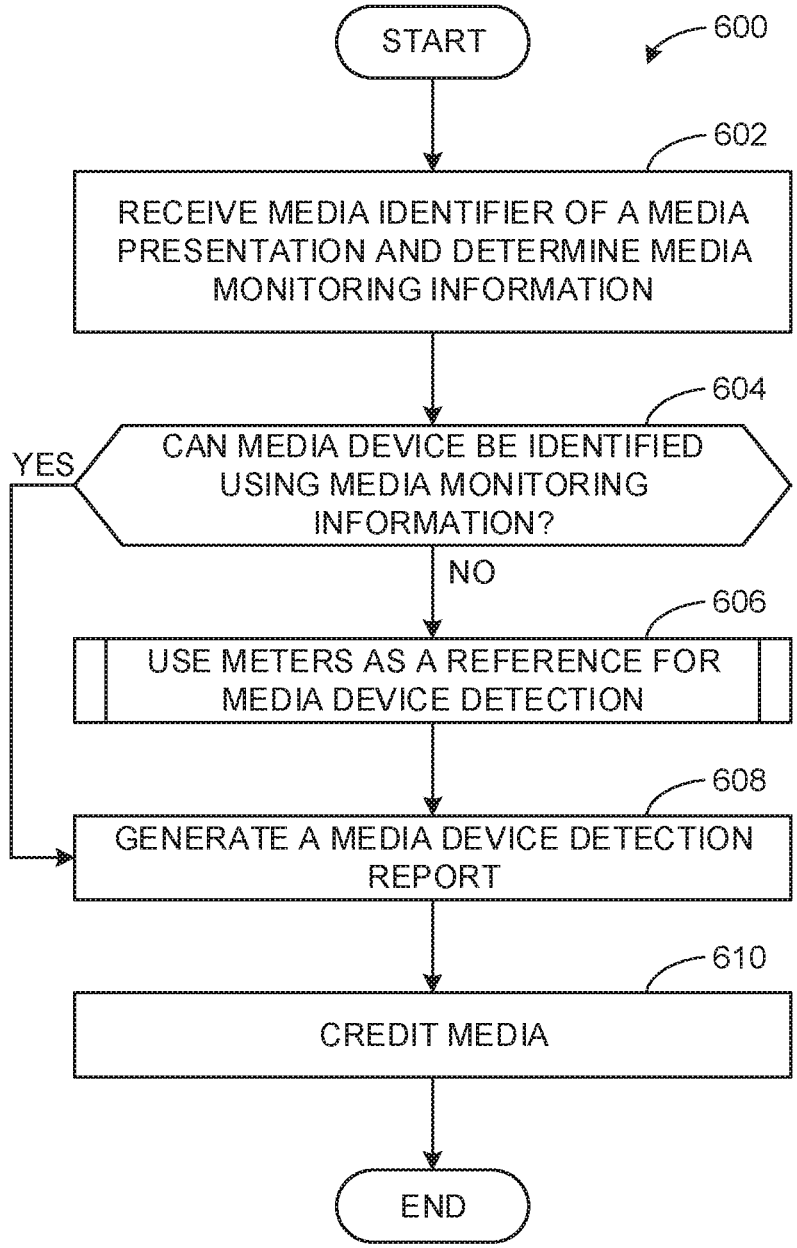
FIG. 6 is a flowchart representative of example machine-readable instructions that may be executed to implement the example media device analyzer of FIG. 2.
Figure 7:
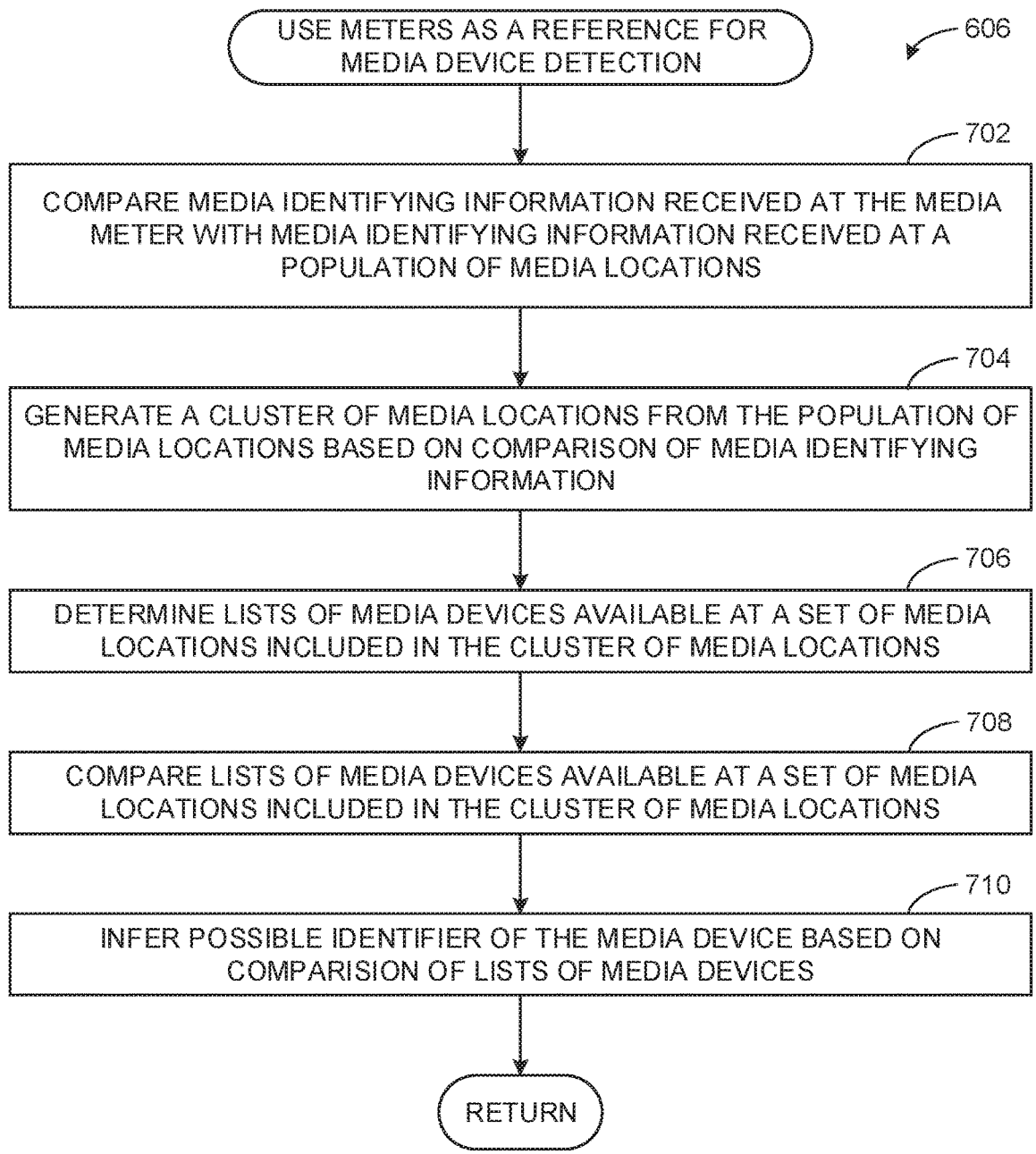
FIG. 7 is a flowchart representative of example machine-readable instructions that may be executed to further implement the example media device analyzer of FIG. 2.

A flowchart representative of example machine readable instructions for implementing the example media device analyzer 204 of FIG. 2 is shown in FIGS. 6-7. In this example, the machine readable instructions comprise a program for execution by a processor such as a processor 812 shown in an example processor platform 800 discussed below in connection with FIG. 8. The program may be embodied in software stored on a non-transitory computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIGS. 6-7, many other methods of implementing the example media device analyzer 204 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 6-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Example machine readable instructions 600 that may be executed to perform detection and identification of an unidentified media device for a media presentation in the example environment of use 100 of FIG. 1 are illustrated in FIG. 6. With reference to the preceding figures and associated description, the example machine readable instructions 600 of FIG. 6 begin execution at block 602, at which at least one of the wired media meter 124, the minimally invasive media meter 142, and the wireless media meter 152 detects a media identifier of an example media presentation presented at the presentation device 118 by at least one of the media device(s) 102, 104, 106, or 108. Further, media monitoring information, in some examples including media identifying information, is processed by at least one of the metering handler(s) 140, 150, or 156, distributed to the Audience Measurement Entity (AME) 160 via the network 158, and stored in the media database 202.

At block 604, in response to the media database interface 302 of the media device analyzer 204 receiving media monitoring information from the media database 202, the media device recognition determiner 304 determines whether a media device can be identified from the media monitoring information received at the media database interface 302. In some examples, determining whether a media device can be identified from the media monitoring information received further includes determining whether a media meter is the wired media meter 124, including one or more media device connectors 132, 134, 136, and 138 connected to one or more media devices 102, 104, 106, and 108. In such examples, the wired media meter 124 is capable of receiving a media device identifier directly from one or more media devices 102, 104, 106, and 108.

Additionally or alternatively, determining whether a media device can be identified from the media monitoring information received further includes determining whether a media device identifier is included in or otherwise implemented by the media identifying information as included in or otherwise implemented by the media monitoring information.

At block 606, further detailed below in conjunction with FIG. 7, in response to the media device recognition determiner 304 determining that a media device cannot be identified from media identifying information received at the media database interface 302, the media device analyzer 204 is to determine an identifier of an unidentified media device presenting media utilizing a cluster of media locations including media meters from a reference population of media locations including media meters as a reference.

At block 608, in response to at least one of the media device recognition determiner 304 determining that a media device can be identified from media identifying information received at the media database interface 302 or the media device analyzer 204 completing the determination of an identifier of a media device presenting media at block 606, the media device report generator 312 is to generate a report on the identifier of a media device presenting media.

Additionally or alternatively at block 608, the media device report generator 312 can generate a report indicating whether a media device identifier was determined from media identifying information.

Additionally or alternatively at block 608, the media device report generator 312 can generate a report indicating at least one of an identifier of a media device determined to be presenting media and the proportion of media locations at the media location cluster the media device is determined to be available in.

Additionally or alternatively at block 608, the media device report generator 312 can generate a report indicating one or more media location identifiers of one or more media locations determined to be at a media location cluster by the cluster generator 306.

Additionally or alternatively at block 608, the media device report generator 312 can generate a report indicating one or more media device lists, generated by the media device determiner 308, for one or more media locations determined to be at a media location cluster by the cluster generator 306.

Additionally or alternatively at block 608, the media device report generator 312 can generate a report pertaining to any output of at least one of the media device recognition determiner 304, the cluster generator 306, the media device determiner 308, and the cluster based media device identifier 310.

At block 610, in response to the media device report generator 312 completing the generation of a report on the identifier of a media device, the media credit generator 314 is to generate media measurement credits indicative of the presentation of media on media devices. In some examples at block 610, the media credit generator 314 can further distribute the one or more media measurement credits generated to the media crediting database 206. The example machine readable instructions 600 of the illustrated example of FIG. 6 are then terminated.

Example machine readable instructions that may be executed to use meters as a reference for media device detection (FIG. 6, block 606) by the media device analyzer 204 of FIG. 2 are illustrated in FIG. 7. With reference to the preceding figures and associated descriptions, the example method of FIG. 7 begins execution at block 702 at which the example cluster generator 306 compares media identifying information of a media presentation received from the media database 202 via the media database interface 302 with media identifying information received at a population of media locations, received from the media crediting database 206 via the media database interface 302.

At block 704, based upon the comparison of media identifying information of a media presentation and media identifying information received at a population of media locations completed utilizing the example cluster generator 306 at block 702, the example cluster generator 306 is further to generate a cluster of media locations from a population of media locations. In some such examples, the comparison of media identifying information utilized to generate a cluster of media locations is further based upon identifying one or more media locations from the population of media locations that received an example media identifier (e.g., media identifier ABC-123, media identifier XX-YYYY, etc.) included in media identifying information.

Additionally or alternatively, the cluster generator 306 at block 704 can generate a cluster of media locations from a population of media locations by determining one or more media locations from the population of media locations that include an example media device (e.g., a PlayStation 4, a Roku, etc.). Additionally or alternatively, the cluster generator 306 at block 704 can generate a cluster of media locations from a population of media locations by determining one or more media locations from the population of media locations that received media identifying information at a substantially similar time (e.g., 7:22 PM).

At block 706, in response to completing the generation of a cluster of media locations by the cluster generator 306 at block 704, the media device determiner 308 determines a list of media devices available in each example media location of the example media location cluster as generated by the example cluster generator 306. Further, the list of media devices available in each example media location of the example media location cluster can, in some examples, be associated with the media location ID of each media location of the example media location cluster as distributed by the example cluster generator 306.

At block 708, the cluster based media device identifier 310 is to compare lists of media devices available at each media location at a media location cluster as determined by the media device determiner 308 at block 706. In some such examples, the comparison of lists of media devices available at each media location further includes determining one or more media devices available in two or more media locations of the media location cluster.

At block 710, the cluster based media device identifier 310 is further to infer a media device identifier based upon the comparison of media devices available at each media location at a media location cluster completed by the example cluster based media device identifier 310 at block 708. In some examples, inferring a media device identifier is further based upon a ruleset applied to the comparison of media devices available at each media location at a media location cluster. The ruleset, in some examples, can be further defined by determining whether one or more media devices are available (e.g., one or more media devices are listed in a media device list as generated by the media device determiner 308) at each media location of the media location cluster generated by the cluster generator 306.

Additionally or alternatively, the ruleset applied by the cluster based media device identifier 310 at block 710 can be further defined by determining whether one or more media device(s) are available (e.g., one or more media device(s) are listed in a media device list as generated by the media device determiner 308) in a majority of media locations of the media location cluster generated by the cluster generator 306. In some examples, "majority" can be further defined as greater than 50% of the media locations at the media location cluster.

Additionally or alternatively, the ruleset applied by the cluster based media device identifier 310 at block 710 can be further defined by determining whether one or more media devices are available (e.g., one or more media devices are listed in a media device list as generated by the media device determiner 308) in at least a selected proportion of media locations (e.g., 30% of media locations, 40% of media locations, 60% of media locations, 80% of media locations, etc.) of the media location cluster generated by the cluster generator 306.

In some examples, in response to two or more media devices satisfying the ruleset applied by the cluster based media device identifier 310 at block 710, the cluster based media device identifier 310 can further determine the media device available in the greatest proportion of media locations from the two or more media devices satisfying the ruleset.

In some examples, in response to no media devices satisfying the ruleset applied by the cluster based media device identifier 310 at block 710, the cluster based media device identifier 310 can further determine the media device available in the greatest proportion of media locations from the one or more media devices identified in one or more media device lists for one or more media locations of the media location cluster. Upon completion of the application of a ruleset by the cluster based media device identifier 310 at block 710, processing returns to block 608 of the example machine readable instructions 600 of the illustrated example of FIG. 6.

Figure 8:
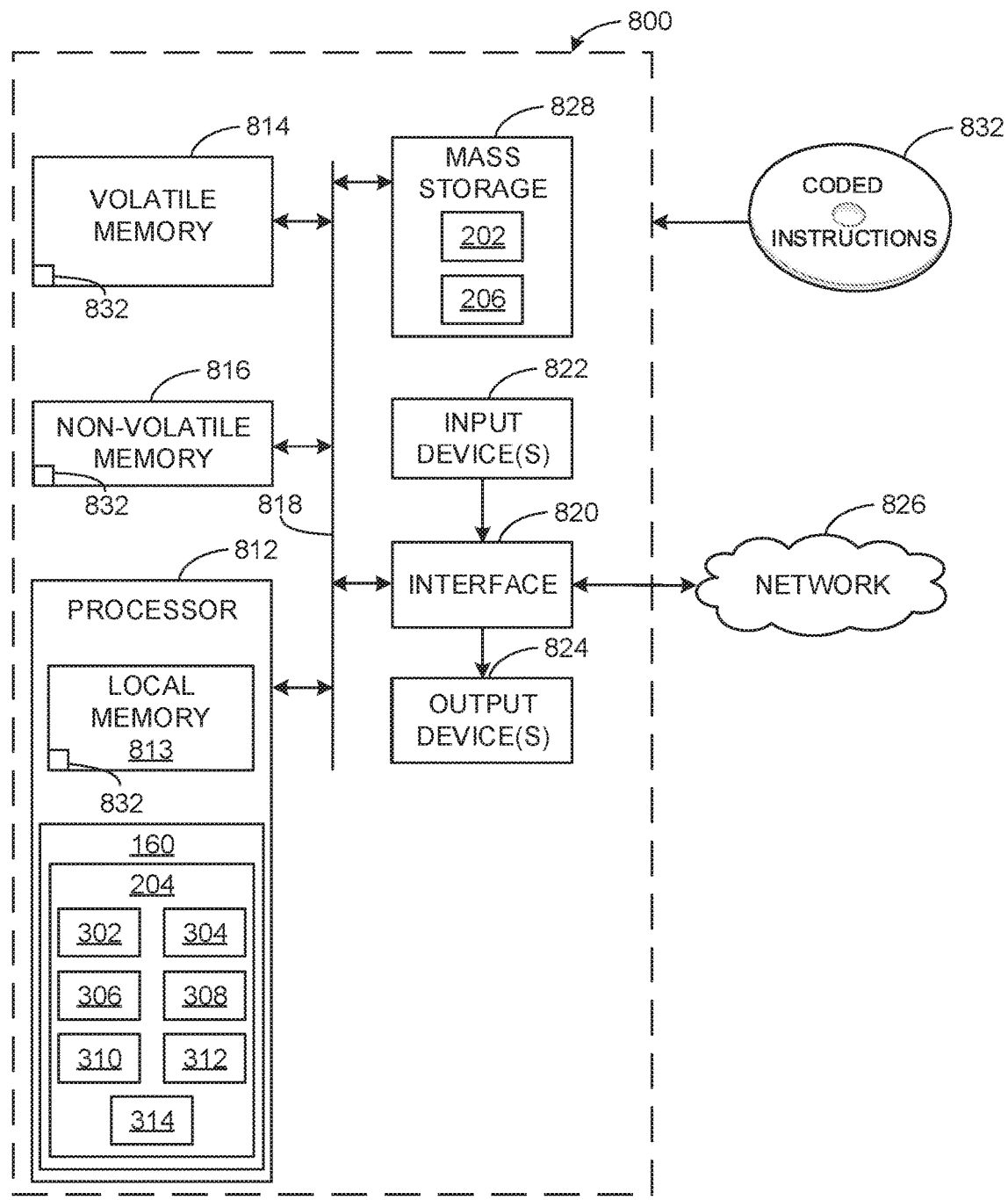
FIG. 8 is a block diagram of an example processor platform capable of executing the instructions of FIGS. 6 and/or 7 to implement the example system of FIG. 2.

FIG. 8 is a block diagram of the example processor platform 800 capable of executing the instructions of FIGS. 6-7 to implement the apparatus of FIGS. 2-3. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes the processor 812. The processor 812 of the illustrated example is hardware. For example, the processor 812 can be implemented by one or more integrated circuits, logic circuits, microprocessors or controllers from any desired family or manufacturer. The hardware processor may be a semiconductor based (e.g., silicon based) device. In this example, the processor implements the example Audience Measurement Entity (AME) 160 which can, in some examples, include the media device analyzer 204 which can, in some examples, include the example media database interface 302, the example media device recognition determiner 304, the example cluster generator 306, the example media device determiner 308, the example cluster based media device identifier 310, the example media device report generator 312, and the example media credit generator 314.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint device and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 6-7 may be stored in the mass storage device 828, in the volatile memory 814, in the non-volatile memory 816, and/or on a removable tangible computer readable storage medium such as a CD or DVD.

From the foregoing, it will be appreciated that example methods, apparatus and articles of manufacture have been disclosed that facilitate inferring a media device identifier when a minimally invasive media meter is utilized and a media device identifier cannot be directly determined from available media monitoring information.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to detect media devices presenting media, the apparatus comprising:
   a cluster generator to generate a cluster of media locations from a reference population of media locations based on media identifying information received from a presentation of media at an unidentified media device at a first media location;
   a media device determiner to determine media devices available at the media locations in the cluster of media locations;
   a cluster based media device identifier to identify the unidentified media device based on (1) the media devices available at the media locations in the cluster of media locations and (2) an identity of a media device determined to be available in a majority of media locations in the cluster of media locations; and
   a media device report generator to generate a report on the identity of the unidentified media device.

2. The apparatus of claim 1, wherein a media meter at the first media location is a minimally invasive media meter that does not include a direct connection to the unidentified media device.

3. The apparatus of claim 2, wherein the reference population of media locations includes at least one media location with a minimally invasive media meter.

4. The apparatus of claim 1, wherein the identity of the unidentified media device cannot be directly determined from the media identifying information received from the presentation of media.

5. The apparatus of claim 1, wherein the cluster generator is further to:
   compare the media identifying information received at a media location of the reference population of media locations and the first media location; and
   add the media location of the reference population to the cluster of media locations when media identifying information received at the media location matches the first media location.

6. The apparatus of claim 1, wherein the identity of the unidentified media device is credited via a media credit generated for the media presentation.

7. A method to detect media devices presenting media, the method comprising:
   generating, via instructions executed with a processor, a cluster of media locations from a reference population of media locations based on media identifying information received from a presentation of media at an unidentified media device at a first media location;
   determining, via instructions executed with the processor, media devices available at the media locations in the cluster of media locations;
   determining, via instructions executed with the processor, an identity of the unidentified media device based on (1) the media devices available at the media locations in the cluster of media locations and (2) an identity of a media device determined to be available in a majority of media locations in the cluster of media locations; and
   generating, via instructions executed with the processor, a report on the identity of the unidentified media device.

8. The method as defined in claim 7, wherein a media meter at the first media location is a minimally invasive media meter that does not include a direct connection to the unidentified media device.

9. The method as defined in claim 8, wherein the reference population of media locations includes at least one media location with a minimally invasive media meter.

10. The method as defined in claim 7, wherein the identifier of the unidentified media device cannot be directly determined from the media identifying information received from the presentation of media.

11. The method as defined in claim 7, wherein generating the cluster of media locations further includes:
comparing the media identifying information received at a media location of the reference population of media locations and the first media location; and
adding the media location of the reference population to the cluster of media locations when media identifying information received at the media location matches the first media location.

12. The method as defined in claim 7, wherein the identity of the unidentified media device is credited via a media credit generated for the media presentation.

13. A non-transitory machine readable storage medium comprising machine readable instructions which, when executed, cause a machine to at least:
generate a cluster of media locations from a reference population of media locations based on media identifying information received from a presentation of media at an unidentified media device at a first media location;
determine media devices available at the media locations in the cluster of media locations;
identify the unidentified media device based on (1) the media devices available at the media locations in the cluster of media locations and (2) an identity of a media device determined to be available in a majority of media locations in the cluster of media locations; and
generate a report on the identity of the unidentified media device.

14. The storage medium of claim 13, wherein a media meter at the first media location is a minimally invasive media meter that does not include a direct connection to the unidentified media device.

15. The storage medium of claim 14, wherein the reference population of media locations includes at least one media location with a minimally invasive media meter.

16. The storage medium of claim 13, wherein the identifier of the unidentified media device cannot be directly determined from the media identifying information received from the presentation of media.

17. The storage medium of claim 13, wherein the instructions to generate the cluster of media locations, when executed, further cause the machine to:
compare the media identifying information received at a media location of the reference population of media locations and the first media location; and
add the media location of the reference population to the cluster of media locations when media identifying information received at the media location matches the first media location.

18. The storage medium of claim 13, wherein the identity of the unidentified media device is credited via a media credit generated for the media presentation.

* * * * *